United States Patent
Shi et al.

(10) Patent No.: US 11,706,835 B2
(45) Date of Patent: *Jul. 18, 2023

(54) HANDLING QOS MOBILITY AND DUAL CONNECTIVITY IN NR

(71) Applicant: Telefonaktiebolaget LM Ericsson (publ), Stockholm (SE)

(72) Inventors: Nianshan Shi, Järfälla (SE); Alexander Vesely, Feldbach (AT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/671,005

(22) Filed: Feb. 14, 2022

(65) Prior Publication Data

US 2022/0174773 A1    Jun. 2, 2022

Related U.S. Application Data

(63) Continuation of application No. 16/969,632, filed as application No. PCT/IB2019/051172 on Feb. 13, 2019, now Pat. No. 11,252,774.

(Continued)

(51) Int. Cl.
*H04W 76/22* (2018.01)
*H04W 76/12* (2018.01)
(Continued)

(52) U.S. Cl.
CPC ............. *H04W 76/22* (2018.02); *H04W 8/08* (2013.01); *H04W 28/0268* (2013.01);
(Continued)

(58) Field of Classification Search
CPC . H04W 28/0268; H04W 48/16; H04W 76/12; H04W 76/22; H04W 84/18; H04W 8/08; H04W 28/02
See application file for complete search history.

(56) References Cited

U.S. PATENT DOCUMENTS

2019/0320476 A1* 10/2019 Wang .................... H04W 76/11
2019/0327642 A1* 10/2019 Peng .................... H04W 76/15
(Continued)

OTHER PUBLICATIONS

Author Unknown, "Technical Specification Group Radio Access Network; Evolved Universal Terrestrial Radio Access (E-UTRA) and NR; Multi-connectivity; Stage 2 (Release 15)," Technical Specification 37.340, Version 15.0.0, 3GPP Organizational Partners, Dec. 2017, 51 pages.

(Continued)

*Primary Examiner* — Nathan S Taylor
(74) *Attorney, Agent, or Firm* — Withrow & Terranova, PLLC

(57) ABSTRACT

Systems and methods are provided herein for handling Quality of Service (QoS) mobility and dual connectivity. In some embodiments, a method of operation of a network node in a cellular communications network includes deciding to split an existing Protocol Data Unit (PDU) session that includes a current uplink tunnel information; and setting up resources for the split PDU session. In this way, it may be possible to support QoS mobility in the different tunnel during dual connectivity. In some embodiments, the network node is a Master Next Generation—Radio Access Network (NG-RAN) node, and setting up resources for the split PDU session includes sending an S-Node Addition/Modification Request including the current uplink tunnel information for the split PDU session to a Secondary NG-RAN node in the cellular communications network; and receiving a newly added additional downlink tunnel information from the Secondary NG-RAN node.

14 Claims, 12 Drawing Sheets

Related U.S. Application Data

(60) Provisional application No. 62/630,632, filed on Feb. 14, 2018.

(51) Int. Cl.
    *H04W 8/08*     (2009.01)
    *H04W 28/02*     (2009.01)
    *H04W 48/16*     (2009.01)
    *H04W 84/18*     (2009.01)

(52) U.S. Cl.
    CPC ........... *H04W 48/16* (2013.01); *H04W 76/12* (2018.02); *H04W 84/18* (2013.01)

(56) References Cited

U.S. PATENT DOCUMENTS

| | | | |
|---|---|---|---|
| 2020/0015116 A1* | 1/2020 | Huang | H04W 36/00 |
| 2020/0029389 A1* | 1/2020 | Yilmaz | H04W 76/18 |
| 2020/0084815 A1* | 3/2020 | Rinne | H04W 76/12 |
| 2020/0252985 A1* | 8/2020 | Vesely | H04L 45/24 |
| 2020/0260325 A1* | 8/2020 | Futaki | H04W 28/0967 |
| 2020/0337111 A1* | 10/2020 | Shi | H04L 67/143 |

OTHER PUBLICATIONS

Author Unknown, "Technical Specification Group Radio Access Network; NG-RAN; NG Application Protocol (NGAP) (Release 15)," Technical Specification 38.413, Version 0.6.0, 3GPP Organizational Partners, Jan. 2018, 94 pages.

Author Unknown, "Technical Specification Group Radio Access Network; NG-RAN; Xn application protocol (XnAP) (Release 15)," Technical Specification 38.423, Version 0.6.0, 3GPP Organizational Partners, Jan. 2018, 76 pages.

Ericsson, "R3-173952: MN and SN role for QoS flow to DRB mapping," Third Generation Partnership Project (3GPP), TSG-RAN WG3 Meeting #97bis, Oct. 9-13, 2017, 14 pages, Prague, Czech Republic.

Ericsson, "R3-173953: PDU Session Split at UPF," Third Generation Partnership Project (3GPP), TSG-RAN WG3 Meeting #97bis, Oct. 9-13, 2017, 10 pages, Prague, Czech Republic.

ZTE, "R3-173479: NGAP Impacts due to PDU Session Split of NG-U," Third Generation Partnership Project (3GPP), TSG RAN WG3#97bis, Oct. 9-13, 2017, 7 pages, Prague, Czech Republic.

International Search Report and Written Opinion for International Patent Application No. PCT/IB2019/051172, dated May 9, 2019, 17 pages.

Written Opinion for International Patent Application No. PCT/IB2019/051172, dated Jan. 17, 2020, 11 pages.

International Preliminary Report on Patentability for International Patent Application No. PCT/IB2019/051172, dated May 27, 2020, 37 pages.

Notice of Allowance for U.S. Appl. No. 16/969,632, dated Oct. 4, 2021, 15 pages.

\* cited by examiner

HANDLING QOS MOBILITY AND DUAL CONNECTIVITY IN NR

RELATED APPLICATIONS

This application is a continuation of U.S. patent application Ser. No. 16/969,632, filed Aug. 13, 2020, now U.S. Pat. No. 11,252,774, which is a 35 U.S.C. § 371 national phase filing of International Application No. PCT/IB2019/051172, filed Feb. 13, 2019, which claims the benefit of provisional patent application Ser. No. 62/630,632, filed Feb. 14, 2018, the disclosures of which are hereby incorporated herein by reference in their entireties.

TECHNICAL FIELD

The disclosed subject matter relates generally to telecommunications. Certain embodiments relate more particularly to concepts such as handling Quality of Service (QoS) mobility and dual connectivity.

BACKGROUND

Third Generation Partnership Project (3GPP) Release 15 introduces New Radio (NR) and the dual connectivity from the early releases is expanded to cover the dual connectivity between Long Term Evolution (LTE) node and NR node, or between two NR nodes, refer to FIGS. 1A and 1B. Further, one Protocol Data Unit (PDU) session may be split in the User Plane Function (UPF), so one part of the PDU session goes via one node and the rest of the PDU session goes via another node.

With NR, the PDU session contains Quality of Service (QoS) flows. The QoS flows are mapped by the Radio Access Network (RAN) into radio bearers. There currently exist certain challenges when one Next Generation—RAN (NG-RAN) node decides to move some of the QoS flows to another NG-RAN node; the current specification provides the means when the PDU session is setup in one tunnel over NG interface. There is no support if an additional General Packet Radio Service (GPRS) Tunneling Protocol (GTP)-U tunnel over NG-U is to be setup for the same existing PDU session, so that some of the QoS flows goes to one NG-RAN node in one GTP-U tunnel and some other QoS flows in the same PDU session goes to another NG-RAN node in another GTP-U tunnel over NG-U.

Certain aspects of the present disclosure and their embodiments may provide solutions to these or other challenges. Some embodiments disclosed herein relate to when the NG-RAN node decides to split the existing PDU sessions in the UPF, so that some of the QoS flows in the PDU sessions will go to new NG-RAN node (Secondary NG-RAN (S-NG-RAN) node) in a new GTP-U tunnel over NG-U (between the UPF and NG-RAN node).

There are, proposed herein, various embodiments which address one or more of the issues disclosed herein. Certain embodiments may provide one or more of the following technical advantage(s). It is possible to support QoS mobility in the different GTP-U tunnel over NG-U during dual connectivity.

SUMMARY

Systems and methods are provided herein for handling Quality of Service (QoS) mobility and dual connectivity. In some embodiments, a method of operation of a network node in a cellular communications network includes deciding, by the network node, to split an existing Protocol Data Unit (PDU) session that includes a current uplink tunnel information; and setting up, by the network node, resources for the split PDU session. In this way, it may be possible to support QoS mobility in the different tunnel during dual connectivity.

In some embodiments, the network node is a Master Next Generation—Radio Access Network (M-NG-RAN) node, and setting up resources for the split PDU session includes sending, by the M-NG-RAN node, an S-Node Addition/Modification Request including the current uplink tunnel information for the split PDU session to a Secondary NG-RAN (S-NG-RAN) node in the cellular communications network; and receiving, by the network node, newly added additional downlink tunnel information from the S-NG-RAN node.

In some embodiments, the method also includes sending, by the M-NG-RAN node, a PDU Session Resource Modify Indication to a Fifth Generation Core (5GC) node in the cellular communications network. In some embodiments, the PDU Session Resource Modify Indication comprises the current downlink tunnel information and the newly added additional downlink tunnel information for the split PDU session. In some embodiments, the PDU Session Resource Modify Indication further comprises a QoS flow for the tunnel identified by the current downlink tunnel information or the newly added additional downlink tunnel information for the split PDU session.

In some embodiments, the method also includes receiving, by the network node, newly added additional uplink tunnel information from the 5GC node. In some embodiments, the 5GC node is an Access and Mobility Management Function (AMF) in the cellular communications network. In some embodiments, at least one of the tunnels is a General Packet Radio Service (GPRS) Tunneling Protocol (GTP)-U tunnel. In some embodiments, the cellular communications network is a Fifth Generation (5G) New Radio (NR) cellular communications network.

In some embodiments, a method of operation of a network node in a cellular communications network includes receiving, by the network node, an S-Node Addition/Modification Request including current uplink tunnel information for an existing PDU session to be split from a M-NG-RAN node in the cellular communications network; and sending newly added additional downlink tunnel information to the M-NG-RAN node. In some embodiments, the network node is a S-NG-RAN node. In some embodiments, at least one of the tunnels is a GTP-U tunnel.

In some embodiments, a method of operation of a network node in a cellular communications network includes receiving, from a M-NG-RAN node, a PDU Session Resource Modify Indication for an existing PDU session to be split. In some embodiments, the PDU Session Resource Modify Indication comprises current downlink tunnel information and newly added additional downlink tunnel information for the split PDU session. In some embodiments, the PDU Session Resource Modify Indication further comprises a QoS flow for the tunnel identified by the current downlink tunnel information or the newly added additional downlink tunnel information for the split PDU session.

In some embodiments, the method also includes sending, by the network node, newly added additional uplink tunnel information to the M-NG-RAN node.

In some embodiments, the network node is an AMF in the cellular communications network.

In some embodiments, a physical network node implementing a network node includes one or more network interfaces; one or more processors; and memory comprising instructions executable by the one or more processors whereby the physical network node is operable to implement the network node and the network node is operable to decide to split an existing PDU session that includes current downlink tunnel information; and set up resources for the split PDU session.

In some embodiments, a physical network node implementing a network node includes one or more network interfaces; one or more processors; and memory comprising instructions executable by the one or more processors whereby the physical network node is operable to implement the network node and the network node is operable to receive an S-Node Addition/Modification Request including current downlink tunnel information for an existing PDU session to be split from a M-NG-RAN node in the cellular communications network; and send newly added additional downlink tunnel information to the M-NG-RAN node.

In some embodiments, a physical network node implementing a network node includes one or more network interfaces; one or more processors; and memory comprising instructions executable by the one or more processors whereby the physical network node is operable to implement the network node and the network node is operable to receive, from a M-NG-RAN node, a PDU Session Resource Modify Indication for an existing PDU session to be split.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Network Node: As used herein, a "network node" is a physical (infrastructure) network node (e.g., a physical network node implementing a Network Function(s) (NF(s)) as a virtual machine(s) or a physical network node operating to provide the functionality of a NF(s)) or a virtual network node (e.g., a virtual machine that provides the functionality of NF(s) and operates on a physical network node).

Note that the description given herein focuses on a Third Generation Partnership Project (3GPP) cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to Fifth Generation (5G) and/or New Radio (NR) concepts, beams may be used instead of cells and, as such, it is important to note that the concepts described herein are equally applicable to both cells and beams.

Figure 1A:
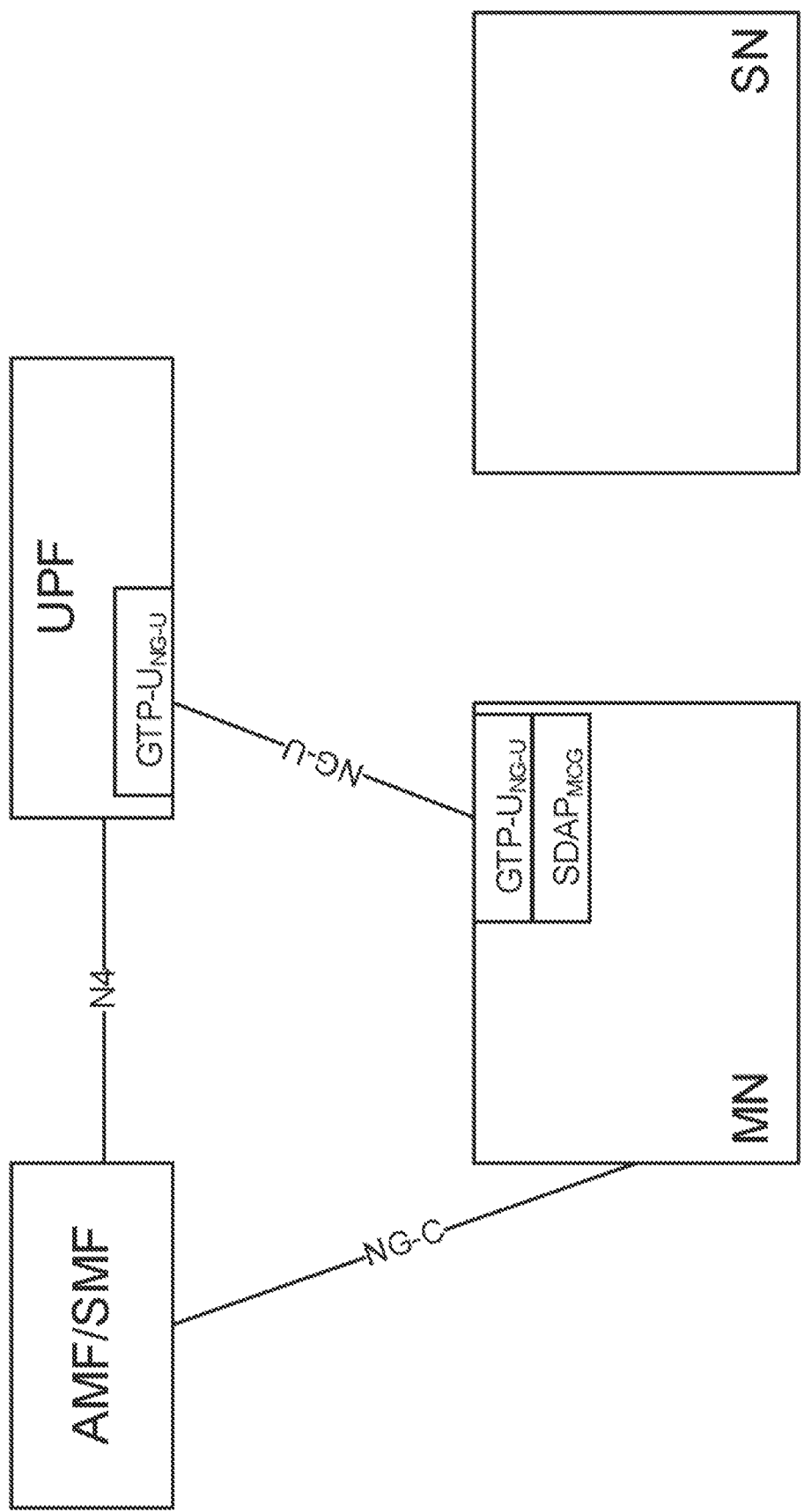
FIGS. 1A and 1B illustrate a relationship between several nodes in a Fifth Generation (5G) New Radio (NR) cellular communications network, according to some embodiments of the present disclosure.
Figure 1B:
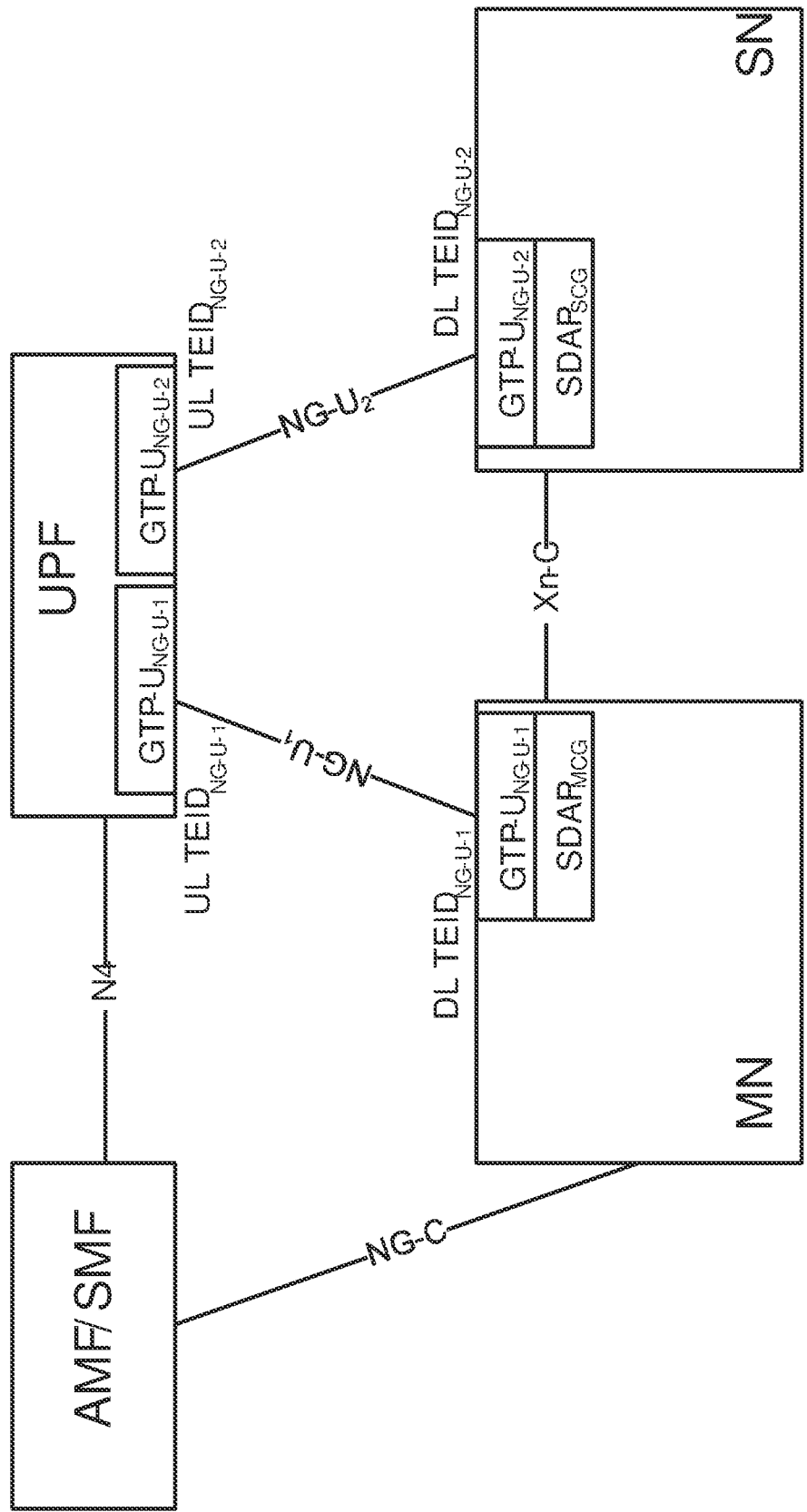

FIGS. 1A and 1B illustrate a relationship between several nodes in a 5G cellular communications network. Specifically shown are an Access and Mobility Management Function (AMF)/Session Management Function (SMF), a User Plane Function (UPF), a Master Next Generation—Radio Access Network (M-NG-RAN) node (sometimes referred to herein as an MN), and a Secondary NG-RAN (S-NG-RAN) node (sometimes referred to herein as an SN).

Some properties of the NFs shown in FIGS. 1A and 1B may be described in the following manner. The AMF provides User Equipment (UE)-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session.

Figure 2:
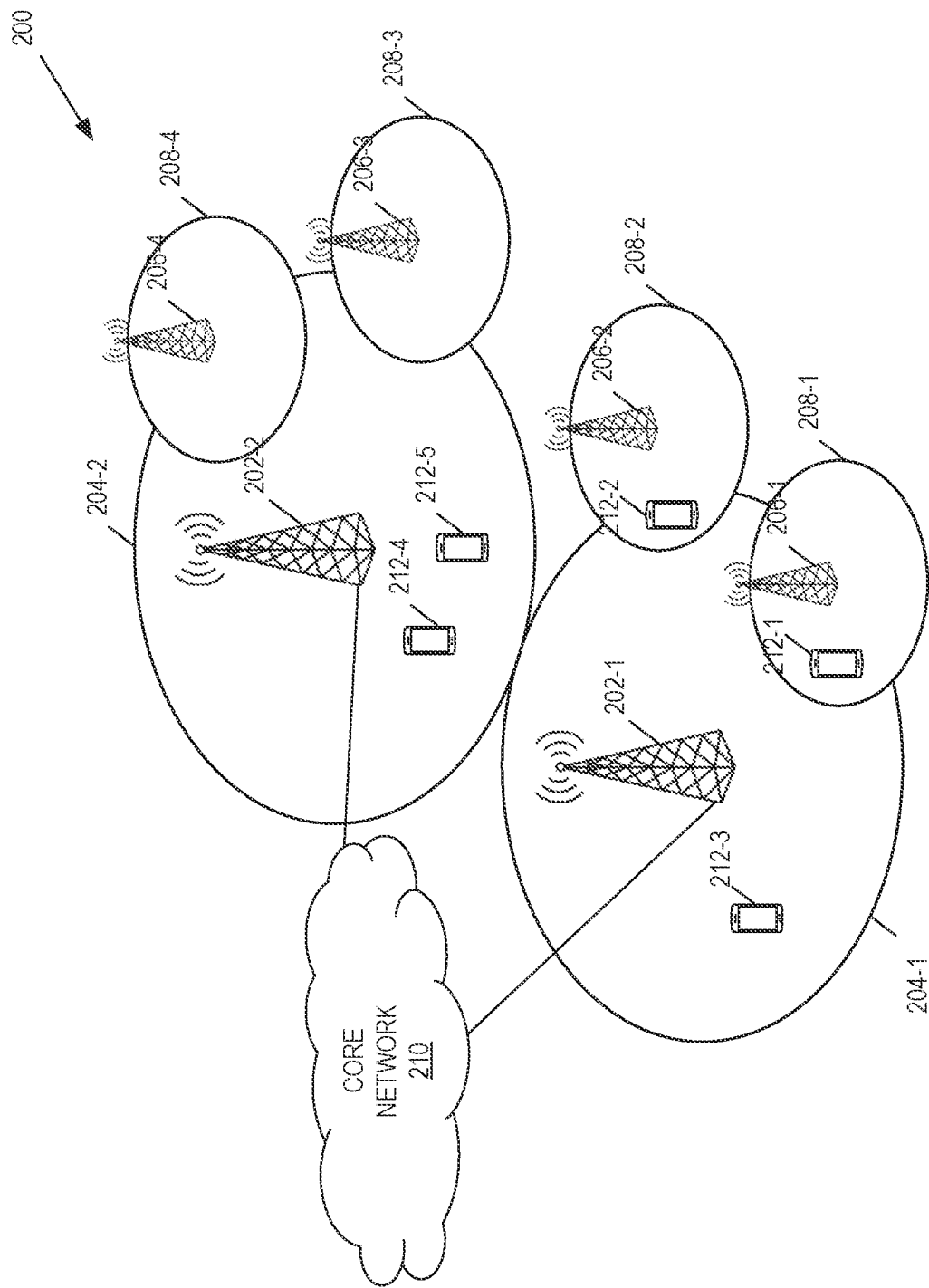
FIG. 2 illustrates one example of a cellular communications network according to some embodiments of the present disclosure.

FIG. 2 illustrates one example of a cellular communications network 200 according to some embodiments of the present disclosure. In the embodiments described herein, the cellular communications network 200 is a 5G network. In this example, the cellular communications network 200 includes base stations 202-1 and 202-2, which in Long Term Evolution (LTE) are referred to as enhanced or evolved Node Bs (eNBs) and in NR are referred to as NR base stations (next-generation Node Bs or gNBs), controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 also includes a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210 which may be a 5G core network.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3A:
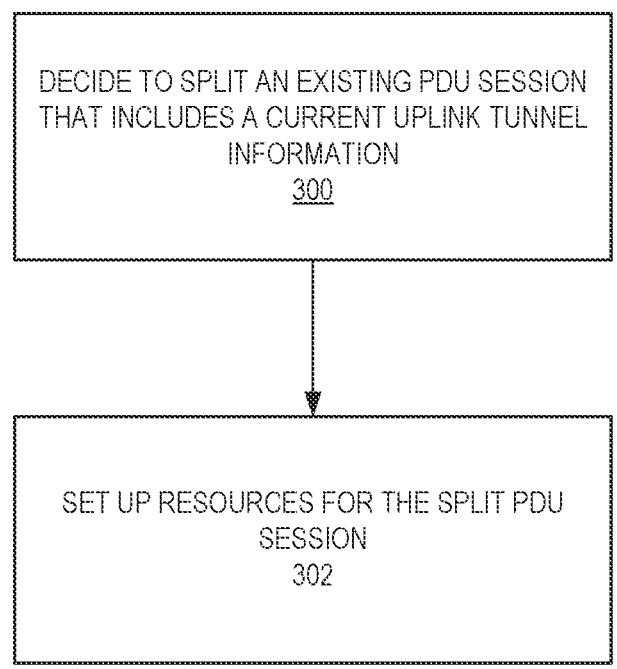
FIGS. 3A and 3B illustrate a method implemented in a communication system according to some embodiments of the present disclosure.

FIG. 3A illustrates a method of operating a network node in a cellular communications network 200. The network node decides to split an existing PDU session that includes a current uplink tunnel information (Step 300). As used herein, a "split PDU session" is when the PDU session is split into two tunnels and not into two PDU sessions. The network node then sets up resources for the split PDU session (Step 302). As used herein, a network node 304 is any node that is capable of performing the described functions. For instance, in some embodiments, the network node 304 is a S-NG-RAN node 306, a M-NG-RAN node 308, or an AMF 310 as discussed herein. In some embodiments, the M-NG-RAN node includes the uplink tunnel information that has been used early at M-NG-RAN node when the first tunnel was created for the PDU session. Also, in some embodiments, since it is mandatory to send the uplink tunnel information in S-NG-RAN node addition/modification, M-NG-RAN node sends the uplink ID that it is using. This results in essentially a Y-shaped tunnels at this stage.

Embodiment 1

Figure 3B:
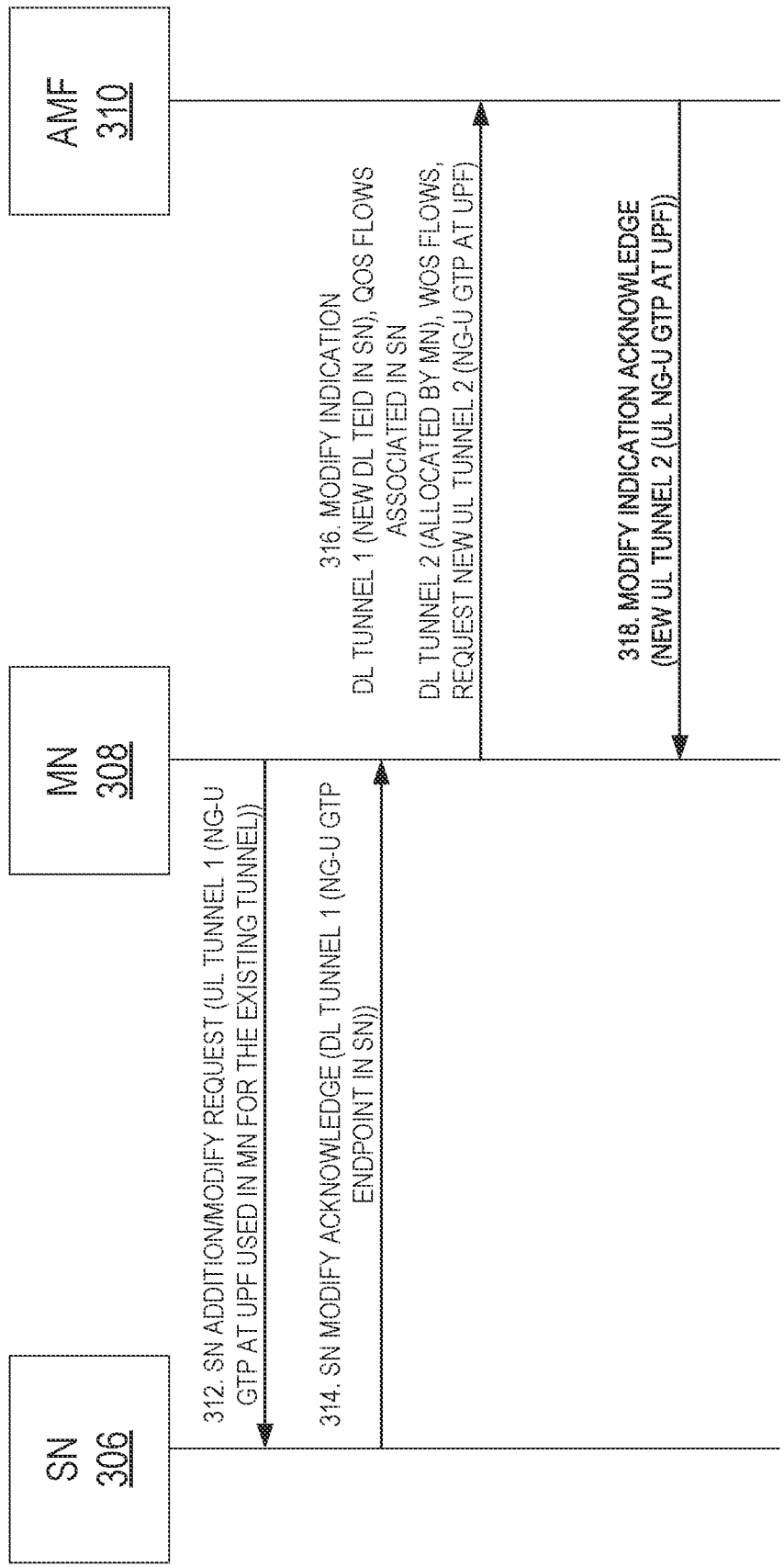

In this embodiment refer to FIG. 3B, when the M-NG-RAN node 308 decides to split the current PDU session into two General Packet Radio Service (GPRS) Tunneling Protocol (GTP)-U tunnels, it decides to send the current uplink tunnel information, e.g., the current uplink GTP-U tunnel information for the Protocol Data Unit (PDU) session to the S-NG-RAN node 306 (Step 312). The S-NG-RAN node 306 allocates a downlink tunnel which will be sent to the 5G Core (5GC) by the M-NG-RAN node 308 (Step 314).

Further, the M-NG-RAN node 308 sends additional downlink GTP-U tunnel information (e.g., either the one used for the existing tunnel before the split at the M-NG-RAN node 308 or allocate a new one) to the 5GC (shown as the AMF 310) and requests a new additional uplink GTP-U tunnel from the 5GC in the modification (Step 316). The additional tunnel is setup between the UPF and the M-NG-RAN node 308 (Step 318). Note that in some embodiments, "tunnel" can be used instead of "downlink tunnel" or "uplink tunnel." Although a tunnel may be identified by the downlink TNL information or the uplink TNL information, the tunnel itself may be bi-directional. In some embodiments, if the other of the downlink TNL information or the uplink TNL information exists, an NG-RAN node may indicate the pair, so that the 5GC knows which uplink TNL is paired to which downlink and vice versa.

In some embodiments, these steps can also be described as follows:

Send the current uplink GTP-U tunnel ("UL Tunnel 1") to the S-NG-RAN node 306, together with the "S-Node Addition" or "Modification" procedure. An explicit indication can be introduced to indicate the PDU session is split at the UPF. For example, see the tables below. This is useful so that the S-NG-RAN node 306 may not further split and try to use the Master Cell Group (MCG) resources.

When an acknowledgement is received from the S-NG-RAN node 306, the M-NG-RAN node 308 will initiate the modification of the PDU session resource, sending the downlink GTP-U tunnel allocated by the S-NG-RAN node 306 to the 5GC ("DL Tunnel 1"), together with the Quality of Service (QoS) flows that will be transferred to the S-NG-RAN node 306. At the same time, the M-NG-RAN node 308 will allocate a new downlink GTP-U tunnel information ("DL Tunnel 2") for the rest of the QoS flows, and request (either explicitly or implicitly) the uplink GTP-U tunnel information for the new tunnel ("UL Tunnel 2"). An example is to add new Information Elements (IEs) to the existing PDU session Modify Indication procedure, as shown in the tables below. If the request of the new GTP-U tunnel is explicit, an indication could be introduced as in the example. Else, the presence of the "Additional DL TNL Information" can be seen as an implicit request. In this embodiment, the existing downlink Transport Network Layer (TNL) Information IE contains the NG-U downlink GTP Tunnel Endpoint at the NG-RAN that the M-NG-RAN node 308 received from the S-NG-RAN node 306 and the Additional DL TNL Information IE contains the NG-U DL GTP Tunnel Endpoint at the NG-RAN that the M-NG-RAN node 308 allocated.

The 5GC will then allocate a new uplink GTP-U tunnel ("UL Tunnel 2") and confirm the modification initiated by the RAN.

The two NG-U tunnels for the same PDU session are set up.

In some embodiments, M-NG-RAN node 308 has to decide when sending the Modify Indication to 5GC which downlink TNL is going to be paired with the existing uplink TNL (at this stage, there are two tunnels for the PDU session, two downlink TNL informations, and one uplink TNL information). If the existing tunnel has paired TNL information DL-A and UL-A, when M-NG-RAN node 308 decides to split the PDU session into two tunnels, it sends UL-A to S-NG-RAN node 306, and S-NG-RAN node 306 allocates and sends back DL-B. The Y-Shaped tunnels are created. It is up to M-NG-RAN node 308 to pair DL-A with UL-A, or to pair DL-B with UL-A, and this decision is indicated to 5GC when M-NG-RAN node 308 indicates which QoS flows are handled by which tunnel. In this way, if M-NG-RAN node 308 pairs DL-A with UL-A (as the tunnel was created from the beginning), then after M-NG-RAN node 308 has received the new UL-B, it should perform a SN-Node Modification, to change the early UL-A to UL-B for the tunnel in S-NG-RAN node 306. If M-NG-RAN node 308 pairs DL-B with the UL-A (as when the additional tunnel is created towards S-NG-RAN node 306), then M-NG-RAN node 308 will swap and pair UL-B to DL-A. This approach may save some Xn signaling.

In case of the PDU session split at UPF fails, the M-NG-RAN node 308 would fall back to the old configuration that it had prior to the modification, including going back to use the existing NG-U GTP-U tunnel for the PDU session.

An example to add new IEs (QoS Flow List, Additional DL TNL Information, QoS Flow in the additional tunnel, Request Additional UL TNL) in PDU session resource Modify Indication in Technical Specification (TS) 38.413.

9.3.1.19 PDU Session Resource Modify Indication Transfer. This IE is transparent to the AMF:

| IE/Group Name | Presence | Range | IE type and reference | Semantics description | Criticality | Assigned Criticality |
|---|---|---|---|---|---|---|
| DL TNL Information | O | | TNL Information 9.3.2.1 | One or multiple RAN Transport Layer Information | — | |
| QoS Flow List | O | | QoS Flow ID List 9.3.1.25 | | | |
| Additional DL TNL Information | O | | TNL Information 9.3.2.2 | Additional DL TNL for the PDU session split at UPF. | | |
| QoS Flow in the additional tunnel | C-ifAdditionalTunnel | | QoS Flow ID List 9.3.1.25 | | | |
| Request Additional UL TNL | C-ifAdditionalTunnel | | ENUMERATED(true, . . . ) | | | |

| Condition | Explanation |
|---|---|
| ifAdditionalTunnel | This IE shall be present if the Additional DL TNL Information IE is present. |

9.2.1.9 PDU Session Resource Modify Confirm:

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| PDU Session Resource Modify Confirm List | | 0 . . . 1 | | | YES | reject |
| >PDU Session Resource Modify Confirm Item IEs | | 1 . . . <maxnoofPDUSessions> | | | EACH | reject |
| >>PDU Session ID | M | | <ref> | | — | |
| >>PDU Session Resource Modify Confirm Transfer | M | | 9.3.1.20 | | — | |
| >>Additional UL Transport Layer Information | O | | Transport Layer Information 9.3.2.2 | Additional 5GC Transport Layer Address for split PDU session | — | |
| >>PDU Session Split at UPF Modify Confirm Transfer | C-ifAdditionalTunnel | | | PDU Session Resource Modify Confirm Transfer 9.3.1.20 | — | |
| >>S-NSSAI [FFS] | O | | 9.3.1.35 | | — | |
| Criticality Diagnostics | O | | 9.3.1.3 | | YES | ignore |

| Range bound | Explanation |
| --- | --- |
| maxnoofPDUSessions | Maximum no. of PDU sessions allowed towards one UE. Value is FFS. |

An example to add a new IE PDU session Split at the UPF to indicate that the PDU session is split at the UPF in TS 38.423.

9.2.1.6 PDU Session Setup Info—SN Terminated:

| IE/Group Name | Presence | Range | IE type and reference | Semantics description | Criticality | Assigned Criticality |
| --- | --- | --- | --- | --- | --- | --- |
| UL NG-U GTP Tunnel Endpoint at UPF | M | | GTP Tunnel Endpoint <reference> | | — | |
| PDU session Split at UPF | O | | ENUMERATED(true, . . . ) | Indicates that the PDU session is split at UPF. | | |
| Bearer Type | M | | <reference> | | — | |
| QoS Flows To Be Setup List | | 1 | | | — | |
| >QoS Flows To Be Setup Item IEs | | 1 . . . <maxnoofQoSFlows> | | | EACH | reject |
| >>QoS Flow Indicator | M | | <reference> | | — | |
| >>QoS Flow Level QoS Parameters | M | | 9.2.2.1 | For GBR QoS flows, this IE contains GBR QoS flow information as received at NG-C | — | |
| >>Offered GBR QoS Flow Information | O | | GBR QoS Flow Information 9.2.2.2 | This IE contains M-NG-RAN Node offered GBR QoS Flow Information. | — | |
| DL Forwarding | O | | | | — | |

Embodiment 2

Figure 4:
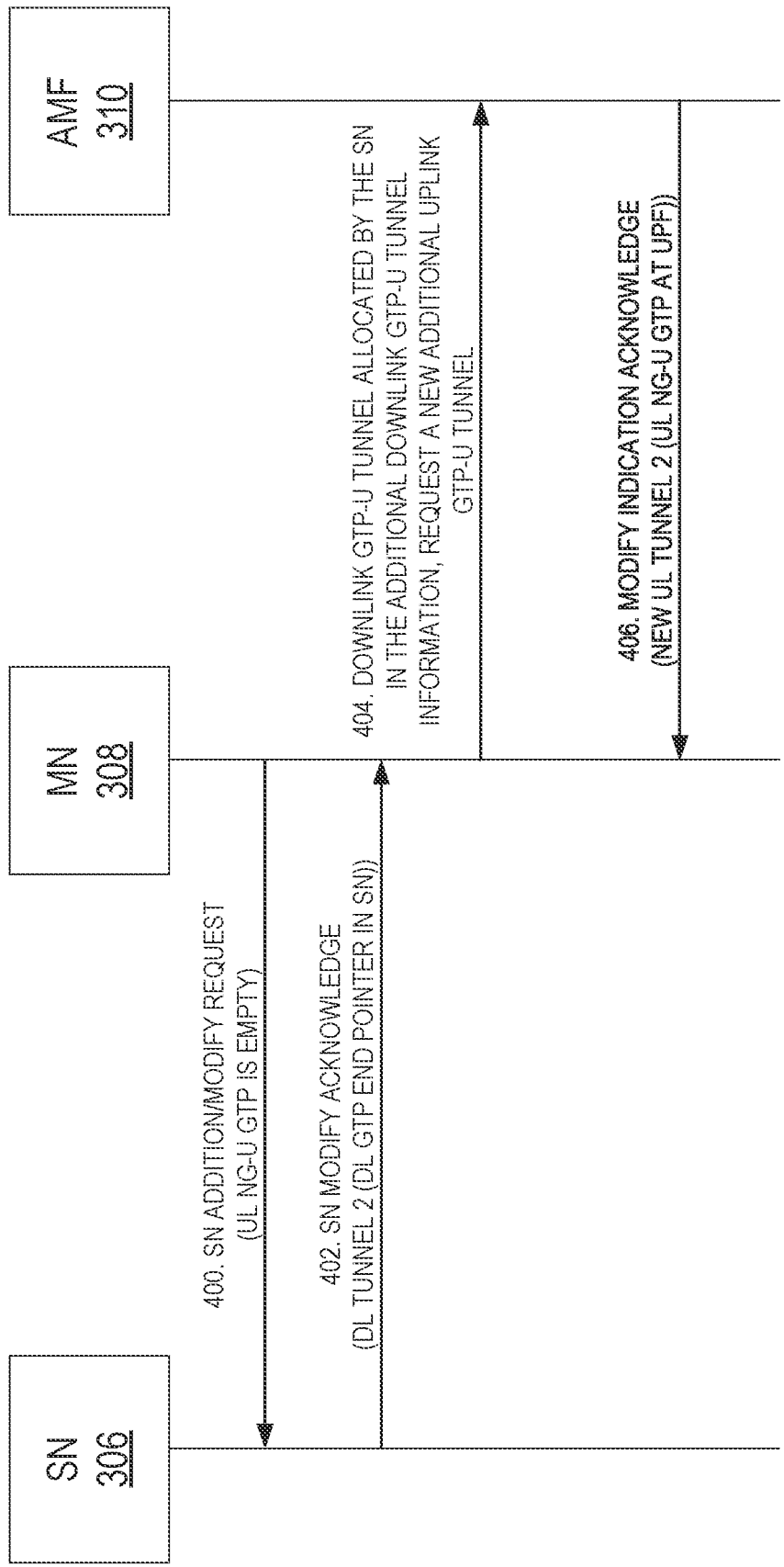
FIGS. 4 through 6 illustrate other methods implemented in a communication system according to some embodiments of the present disclosure.

In this embodiment, refer to FIG. 4, when the NG-RAN node (M-NG-RAN node 308) decides to split the current PDU session into two GTP-U tunnels, the M-NG-RAN node 308 initiates S-Node addition or modification without the uplink GTP-U tunnel information (Step 400). The S-NG-RAN node 306 allocates a downlink GTP-U tunnel and sends it back to the M-NG-RAN node 308 (Step 402). The M-NG-RAN node 308 sends the downlink GTP-U tunnel allocated by the S-NG-RAN node 306 in the additional downlink GTP-U tunnel information to the 5GC and requests a new additional uplink GTP-U tunnel from the 5GC (Step 404). After the new uplink GTP-U tunnel information is received from the 5GC (Step 406), the M-NG-RAN node 308 will inform the S-NG-RAN node 306 of the uplink GTP-U tunnel information so that the additional GTP-U tunnel is setup between the UPF and the S-NG-RAN node 306 (Step 408).

In some embodiments, these steps can also be described as follows:
  Send the QoS flows to be split in "S-Node Addition" or "Modification" procedure. To differentiate this from the legacy behavior, the M-NG-RAN node 308 either does not send a "UL NG-U GTP Tunnel Endpoint at UPF" (which requires changing the current specification from the presence mandatary to optional) as in the table below or sends an explicit indication to specify that the "UL NG-U GTP Tunnel Endpoint at UPF" should be ignored, and the PDU session is split at the UPF. The explicit indication is similar to the tables above.
  In the acknowledgement the S-NG-RAN node 306 will allocate a downlink tunnel ("DL Tunnel 2"). The S-NG-RAN node 306 also understands that it has to wait for the uplink GTP-U tunnel information at the UPF. For example, the S-NG-RAN node 306 will start a timer.
  The M-NG-RAN node 308 will send the downlink GTP-U tunnel allocated by the S-NG-RAN node 306 to the 5GC ("DL Tunnel 2") together with the QoS flows that will be transferred to the S-NG-RAN node 306, and requests a new uplink tunnel, either explicitly or implicitly. The M-NG-RAN node 308 will also indicate the rest of the QoS flows using the existing tunnel ("Tunnel 1"). An example is to add new IEs to the existing PDU session Modify Indication procedure, as is shown in the tables below. If the request of the new GTP-U tunnel is explicit, an indication could be introduced as in the example. Else, the presence of the "Additional DL TNL Information" can be seen as an implicit request. In this embodiment, the existing downlink TNL Information IE contains the NG-U DL GTP Tunnel Endpoint that the M-NG-RAN node 308 allocated earlier (no need to send again) and the Additional DL TNL Information IE contains the NG-U DL GTP Tunnel Endpoint that the M-NG-RAN node 308 received from the S-NG-RAN node 306.

The 5GC will then allocate a new uplink GTP-U tunnel ("UL Tunnel 2") and confirm the modification initiated by the RAN.

The M-NG-RAN node 308 will inform the S-NG-RAN node 306 of the new "UL Tunnel 2" to indicate the completion of the PDU session split at the UPF. One example is to add a new IE in the existing S-NG-RAN node 306 Reconfiguration Completion procedure, as is shown in the table below.

The two NG-U tunnels for the same PDU session are set up.

An example to modify the mandatory presence of the uplink NG-U GTP Tunnel Endpoint at the UPF IE to indicate to the S-NG-RAN node 306 that the PDU session is split at the UPF in TS 38.423.

9.2.1.6 PDU Session Setup Info—SN Terminated:

| IE/Group Name | Presence | Range | IE type and reference | Semantics description | Criticality | Assigned Criticality |
|---|---|---|---|---|---|---|
| UL NG-U GTP Tunnel Endpoint at UPF | M | | GTP Tunnel Endpoint <reference> | | — | |
| PDU session Split at UPF | O | | ENUMERATED(true, . . . ) | Indicates that the PDU session is split at UPF. | | |
| Bearer Type | M | | <reference> | | — | |
| QoS Flows To Be Setup List | | 1 | | | — | |
| >QoS Flows To Be Setup Item IEs | | 1 . . . <maxnoofQoSFlows> | | | EACH | reject |
| >>QoS Flow Indicator | M | | <reference> | | — | |
| >>QoS Flow Level QoS Parameters | M | | 9.2.2.1 | For GBR QoS flows, this IE contains GBR QoS flow information as received at NG-C | — | |
| >>Offered GBR QoS Flow Information | O | | GBR QoS Flow Information 9.2.2.2 | This IE contains M-NG-RAN Node offered GBR QoS Flow Information. | — | |
| DL Forwarding | O | | | | — | |

An example of modifying the existing S-NODE RECONFIGURATION COMPLETE is in TS 38.423.

9.1.2.4 S-Node Reconfiguration Complete

| IE/Group Name | Presence | Range | IE type and reference | Semantics description | Criticality | Assigned Criticality |
|---|---|---|---|---|---|---|
| Message Type | M | | <reference> | | YES | ignore |
| M-NG-RAN node UE XnAP ID | M | | NG-RAN node UE XnAP ID <reference> | Allocated at the M-NG-RAN node | YES | reject |
| S-NG-RAN node UE XnAP ID | M | | NG-RAN node UE XnAP ID <reference> | Allocated at the S-NG-RAN node | YES | reject |

-continued

| IE/Group Name | Presence | IE type and Range reference | Semantics description | Criticality | Assigned Criticality |
|---|---|---|---|---|---|
| Response Information | M | | | YES | ignore |
| >CHOICE Response Type | M | | | | |
| >>Configuration successfully applied | | | | | |
| >>>M-NG-RAN node to S-NG-RAN node Container | O | OCTET STRING | Includes the SCG-ConfigInfo message as defined in xxx. | — | — |
| >>Configuration rejected by the M-NG-RAN node | | | | | |
| >>>Cause | M | <reference> | | — | — |
| >>>M-NG-RAN node to S-NG-RAN node Container | O | OCTET STRING | Includes the SCG-ConfigInfo message as defined in xxx . | — | — |
| >UL NG-U GTP Tunnel Endpoint at UPF | O | GTP Tunnel Endpoint <reference> | | | |

In case of the PDU session split at the UPF fails, the M-NG-RAN node 308 would fall back to the old configuration that it had prior to the modification, including going back to using the existing NG-U GTP-U tunnel for the PDU session.

For the embodiments above, instead of modifying the existing procedure, it is also possible to introduce a new procedure or include the new IEs in other existing messages and in the other positions.

Embodiment 3

In this embodiment, the 5GC and the NG-RAN node will keep the additional uplink tunnel information that is provided during the PDU session resource setup procedure. Currently it is specified that during PDU session resource setup, the core network will provide two uplink tunnel information. If the RAN decides to only setup one tunnel, the SMF should release the addition uplink tunnel. So the specification should now be changed to "SMF shall not release the additional UL tunnel, and both NG-RAN node and 5GC will store the additional UL tunnel information" for future use, refer to FIG. 5.

Figure 5:
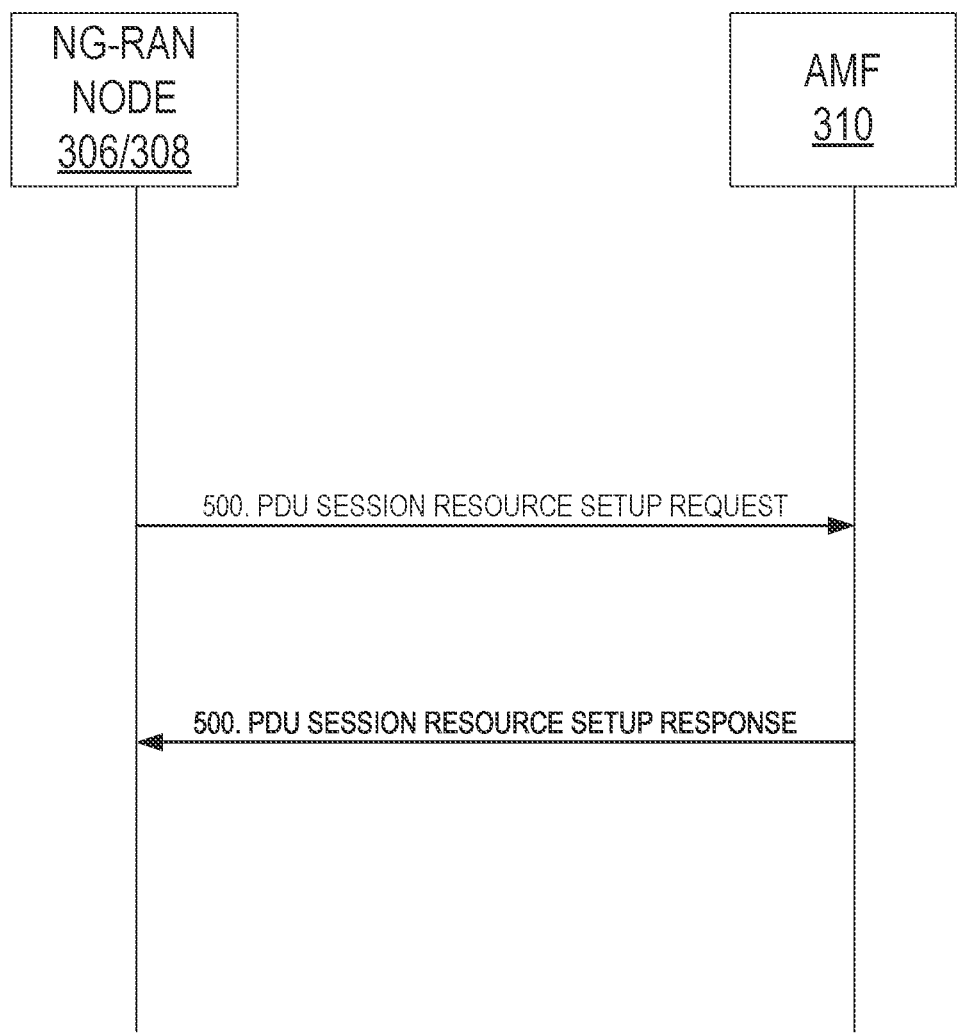

In FIG. 5, the AMF 310 initiates the procedure by sending a PDU SESSION RESOURCE SETUP REQUEST message to the NG-RAN node 306 or 308 (Step 500). The PDU SESSION RESOURCE REQUEST message shall contain the information required by the NG-RAN node 306 or 308 to setup PDU session related NG-RAN configuration consisting of at least one PDU Session Resource for each PDU Session Resource to setup included in PDU Session Resource To Be Setup Item IE.

Upon reception of the PDU SESSION RESOURCE SETUP RESPONSE message (Step 502), the AMF 310 shall, for each PDU session indicated in the PDU Session Identifier (ID) IE, transfer transparently the PDU Session Setup Response Transfer IE to each SMF associated with the concerned PDU session. In case the splitting PDU session is not used by the NG-RAN node 306 or 308, the SMF and NG-RAN node 306 or 308 shall, if supported, store the Additional Transport Layer Information, if any.

When the NG-RAN node 306 or 308 reports unsuccessful establishment of a QoS flow, the cause value should be precise enough to enable the SMF to know the reason for an unsuccessful establishment.

Embodiment 4

Figure 6:
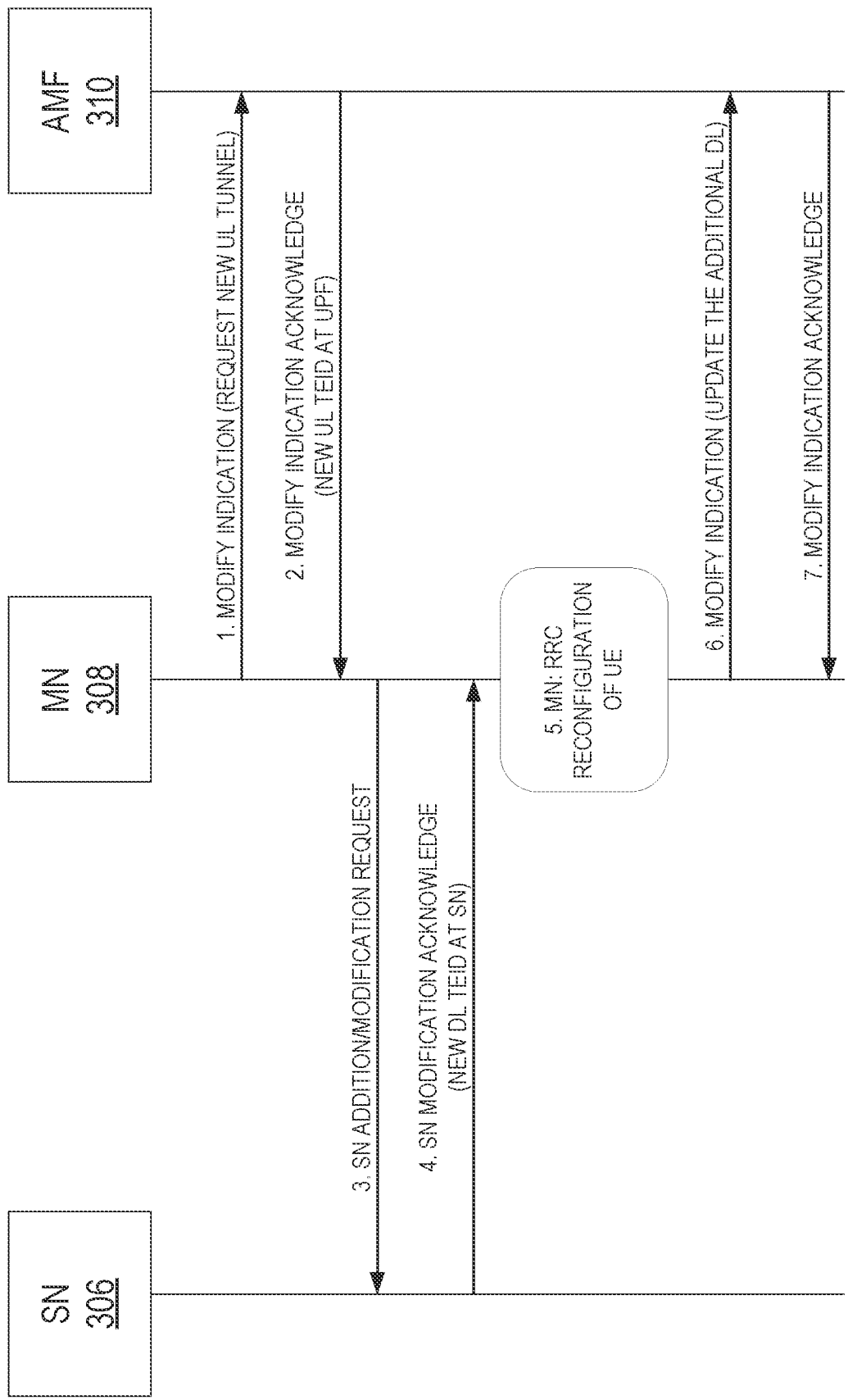

In this embodiment, the M-NG-RAN node 308 first indicates to the 5GC that it wants to split the current PDU session into two tunnels at the UPF. The M-NG-RAN node 308 requests an additional uplink GTP-U tunnel, and also indicates to the 5GC which QoS flow will go to the existing tunnel and which QoS flow will go to the additional tunnel. The 5GC confirms with the new additional uplink tunnel information. The M-NG-RAN node 308 sets up the QoS flow in the S-NG-RAN node 306 and receives the downlink tunnel information. Last, a path update will be performed, refer to FIG. 6 and the tables below.

An example to add new IEs (QoS Flow List, Additional DL TNL Information, QoS Flow in the additional tunnel, Request Additional UL TNL) in PDU session resource Modify Indication in TS 38.413 for Embodiment 4:

9.3.1.19 PDU Session Resource Modify Indication Transfer. This IE is Transparent to the AMF:

| IE/Group Name | Presence | Range | IE type and reference | Semantics description | Criticality | Assigned Criticality |
|---|---|---|---|---|---|---|
| DL TNL Information | O | | TNL Information 9.3.2.1 | One or multiple RAN Transport Layer Information | — | |
| QoS Flow List | O | | QoS Flow ID List 9.3.1.25 | QoS associated to tunnel DL TNL | | |
| Additional DL TNL Information | O | | TNL Information 9.3.2.2 | Additional DL TNL for the PDU session split at UPF. | | |
| Request Additional UL TNL Information | O | | ENUMERATED(true, . . . ) | | | |
| QoS Flow in the additional tunnel | O | | QoS Flow ID List 9.3.1.25 | | | |

9.2.1.9 PDU Session Resource Modify Confirm:

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| PDU Session Resource Modify Confirm List | | 0 . . . 1 | | | YES | reject |
| >PDU Session Resource Modify Confirm Item IEs | | 1 . . . <maxnoofPDUSessions> | | | EACH | reject |
| >>PDU Session ID | M | | <ref> | | — | |
| >>PDU Session Resource Modify Confirm Transfer | M | | 9.3.1.20 | | — | |
| >>Additional UL Transport Layer Information | O | | Transport Layer Information 9.3.2.2 | Additional 5GC Transport Layer Address for PDU session split at UPF | — | |
| >>PDU Session Split at UPF Modify Confirm Transfer | O | | PDU Session Resource Modify Confirm Transfer 9.3.1.20 | | — | |
| >>S-NSSAI [FFS] | O | | 9.3.1.35 | | — | |
| Criticality Diagnostics | O | | 9.3.1.3 | | YES | ignore |

| Range bound | Explanation |
|---|---|
| maxnoofPDUSessions | Maximum no. of PDU sessions allowed towards one UE. Value is FFS. |

Embodiment 5

Figure 7:
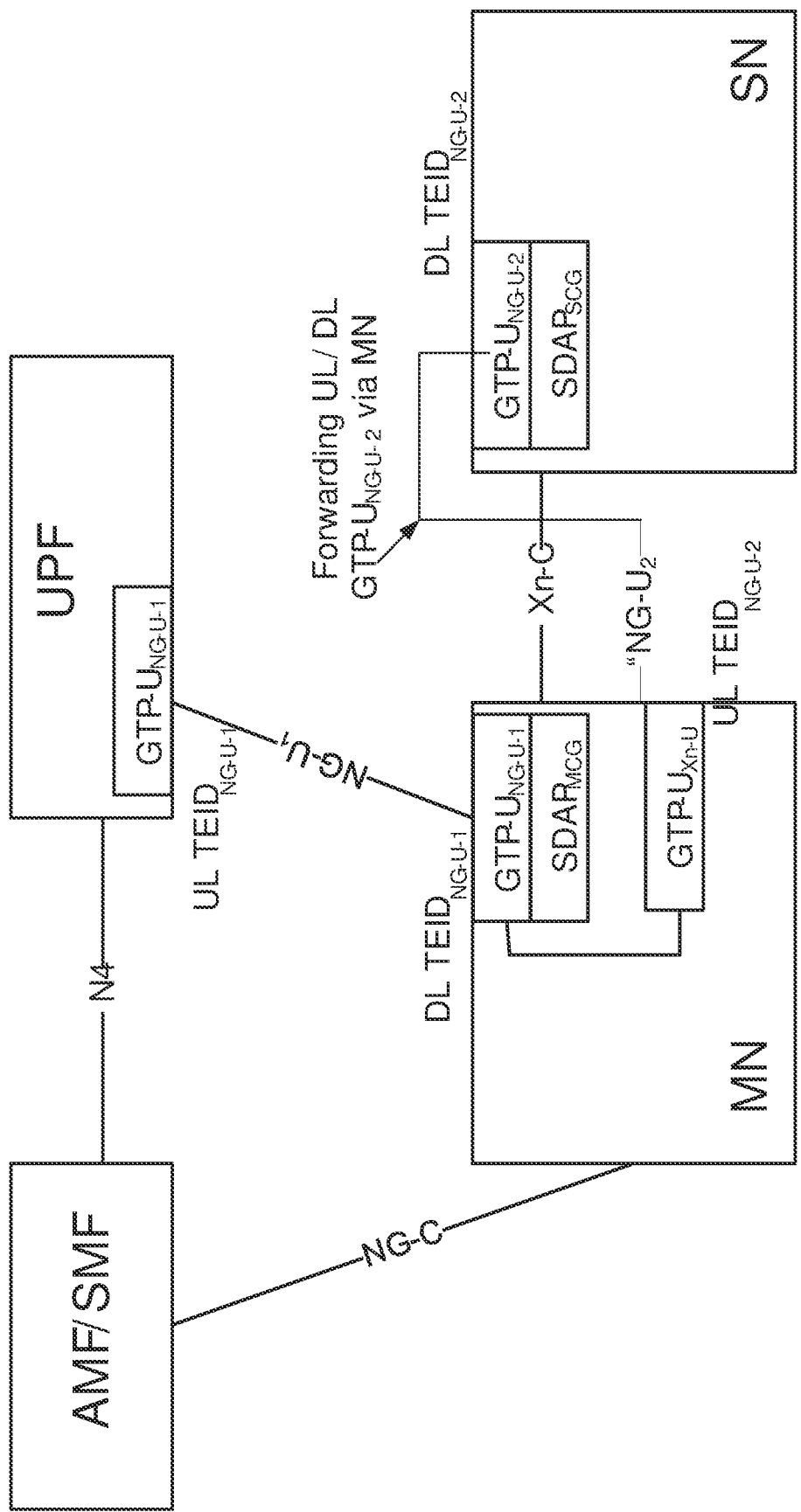
FIG. 7 illustrates a relationship between several nodes in a cellular communications network, according to some embodiments of the present disclosure.

In this embodiment, the M-NG-RAN node 308 first sets up the resources at the S-NG-RAN node 306 using an uplink transport layer address at Xn-U. The S-NG-RAN node 306 sends back a downlink transport layer address. The transition period is shown in FIG. 7. The M-NG-RAN node 308 sends the downlink transport layer address at the S-NG-RAN node 306, together with the information on how the QoS flows are split to 5GC. The 5GC confirms back with an additional uplink transport layer address. The M-NG-RAN node 308 will configure the S-NG-RAN node 306 with the additional uplink transport layer address received from the 5GC (UPF), for the overall description refer to FIG. 8 and the tables below. This solution is the best when handling the data forwarding aspect during modification, as during transition phase there will be an Xn-U tunnel setup for the data forwarding between the M-NG-RAN node 308 and the S-NG-RAN node 306.

For the above solutions, the downlink Non-Access Stratum (NAS) PDU may be included in the message sent from the 5GC, the NG-RAN node shall pass the NAS-PDU IE for the successful operation to the UE (setup, modification).

9.2.1.8 PDU Session Resource Modify Indication

| IE/Group Name | Presence Range | IE type and reference | Semantics description | Criticality | Assigned Criticality |
|---|---|---|---|---|---|
| Message Type | M | 9.3.1.1 | | YES | reject |
| AMF UE NGAP ID | M | 9.3.3.1 | | YES | reject |
| RAN UE NGAP ID | M | 9.3.3.2 | | YES | reject |
| PDU Session Resource Modify Indication List | 1 | | | YES | reject |
| >PDU Session Resource Modify Indication Item IEs | 1..<maxnoofPDUSessions> | | | EACH | reject |
| >>PDU Session ID | M | <ref> | | — | |
| >>PDU Session Resource Modify Indication Transfer | O | 9.3.1.19 | Note 1 | — | |
| >>Additional PDU Session Resource Modify Indication Transfer | O | PDU Session Resource Modify Indication Transfer 9.3.1.19 | Note 2 | — | |

Note 1:
At least one of the PDU Session Resource Modify Indication Transfer or the Additional PDU Session Resource Modify Indication Transfer IE shall be present. QoS flows indicated are remained to the first NG-U tunnel.
Note 2:
Providing this IE in case PDU Session Resource properties related to the additional NG-U GTP-U tunnel needs to be indicated as modified. QoS flows indicated are allocated previously to the first NG-U tunnel, and now in the split tunnel.

9.3.1.19 PDU Session Resource Modify Indication Transfer. This IE is Transparent to the AMF:

| IE/Group Name | Presence Range | IE type and reference | Semantics description | Criticality | Assigned Criticality |
|---|---|---|---|---|---|
| DL TNL Information | O | TNL Information 9.3.2.2 | NG-RAN Transport Layer Address for the PDU session NG-U GTP-U tunnel. | — | |
| Request UL TNL Information | O | ENUMERATED(true, . . . ) | Indicate if to request the 5GC Transport Layer Address for the PDU session NG-U GTP-U tunnel | | |

| IE/Group Name | Presence | Range | IE type and reference | Semantics description | Criticality | Assigned Criticality |
|---|---|---|---|---|---|---|
| QoS Flows List | | 0 ... 1 | | | — | |
| >QoS Flows Item IEs | | 1 ... <maxnoofQoSFlows> | | | — | |
| >>QoS Flow Indicator | M | | <ref> | | — | |

9.2.1.9 PDU Session Resource Modify Confirm:

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF UE NGAP ID | M | | 9.3.3.1 | | YES | reject |
| RAN UE NGAP ID | M | | 9.3.3.2 | | YES | reject |
| PDU Session Resource Modify Confirm List | | 0 ... 1 | | | YES | reject |
| >PDU Session Resource Modify Confirm Item IEs | | 1 ... <maxnoofPDUSessions> | | | EACH | reject |
| >>PDU Session ID | M | | <ref> | | — | |
| >>PDU Session Resource Modify Confirm Transfer | M | | 9.3.1.20 | | — | |
| >>Additional PDU Session Resource Modify Confirm Transfer | M | | 9.3.1.20 | | — | |
| >>S-NSSAI [FFS] | O | | 9.3.1.35 | | — | |
| Criticality Diagnostics | O | | 9.3.1.3 | | YES | ignore |

9.3.1.20 PDU Session Resource Modify Confirm Transfer:

| IE/Group Name | Presence | Range | IE type and reference | Semantics description | Criticality | Assigned Criticality |
|---|---|---|---|---|---|---|
| Transport Layer Information | O | | TNL Information 9.3.2.2 | 5GC Transport Layer Address for the PDU session NG-U GTP-U tunnel. | — | |
| CHOICE PDU Session Resource Modify Confirm Transfer | M | | | | YES | reject |
| >PDU Session Resource Modify Success Confirm | | | | | — | |
| >>QoS Flows Modify List | 1 | | | | — | |
| >>>QoS Flows Modify Item IEs | | 1 ... <maxnoofQoSFlows> | | | — | |
| >>>>QoS Flow Indicator | M | | <ref> | | EACH | reject |

| IE/Group Name | Presence Range | IE type and reference | Semantics description | Criticality | Assigned Criticality |
|---|---|---|---|---|---|
| >>QoS Flows Failed To Modify List | O | QoS Flow List 9.3.1.24 | | YES | ignore |
| >PDU Session Resource Modify Failure Confirm [FFS] | | | | — | |
| >>Cause [FFS] | M | 9.3.1.2 | | — | |

The drawback is that the UPF may have many unused uplink tunnel end points. The benefit is that the PDU session slit at the UPF during modification is much simplified, only the M-NG-RAN node 308 needs to indicate the new downlink tunnel information, for example, as shown in the tables above. There is no need to send "Request Additional UL TNL" by the NG-RAN node and there is no need to send Additional UL Transport Layer Information by the UPF.

The PDU SESSION RESOURCE REQUEST message shall contain the information required by the NG-RAN node to setup PDU session related NG-RAN configuration consisting of at least one PDU Session Resource for each PDU Session Resource to setup included in PDU Session Resource To Be Setup Item IE.

Upon reception of the PDU SESSION RESOURCE SETUP RESPONSE message the AMF shall, for each PDU session indicated in the PDU Session ID IE, transfer transparently the PDU Session Setup Response Transfer IE to each SMF associated with the concerned PDU session. In case the splitting PDU session is not used by the NG-RAN node, the SMF and the NG-RAN node shall, if supported, store the Additional Transport Layer Information, if any.

When the NG-RAN node reports unsuccessful establishment of a QoS flow, the cause value should be precise enough to enable the SMF to know the reason for an unsuccessful establishment.

Figure 8:
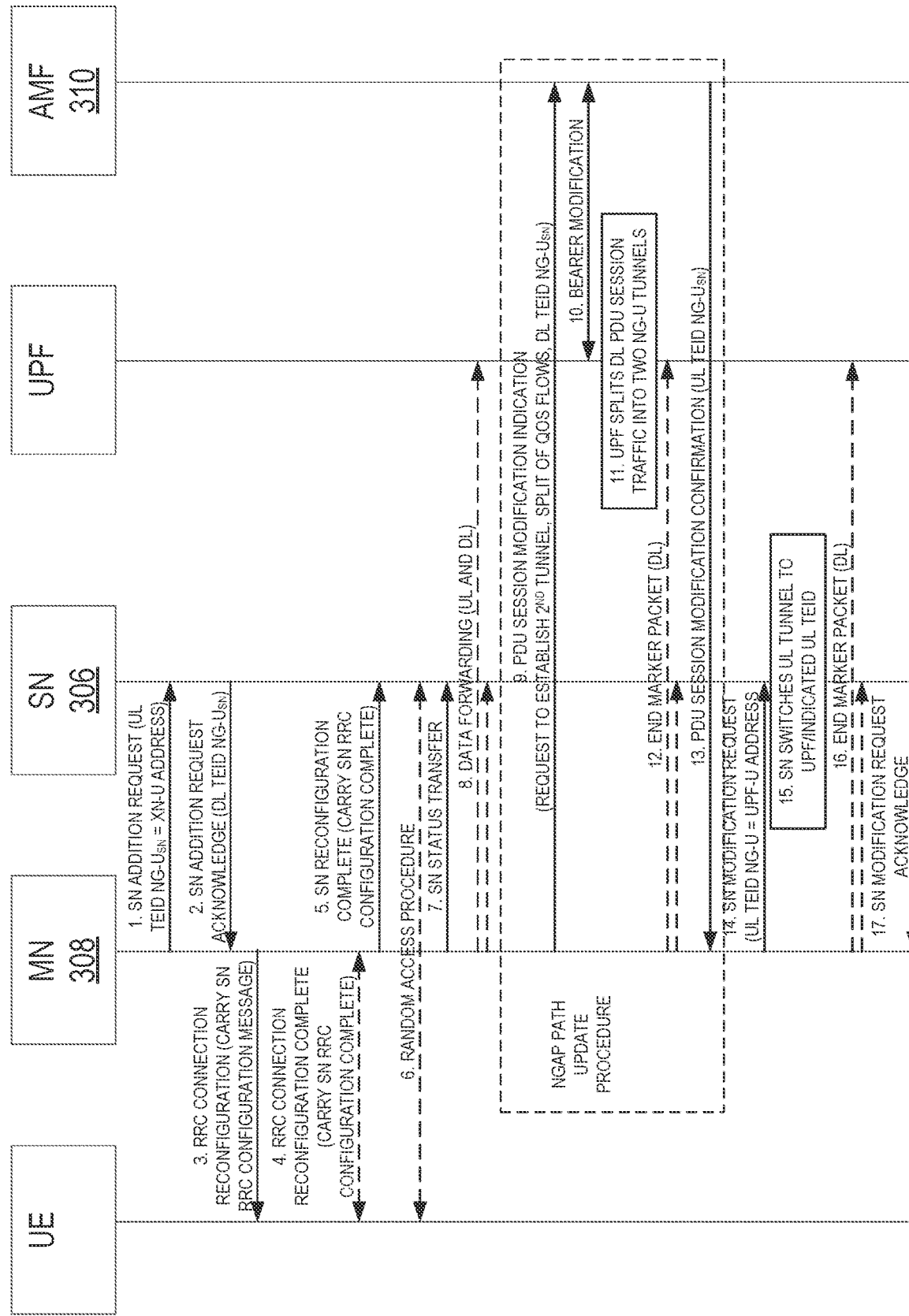
FIG. 8 illustrates other methods implemented in a communication system according to some embodiments of the present disclosure.

In regards to FIG. 8, the description as of TS 37.340 § 10.2.2 applies. In addition:

1. The M-NG-RAN node 308 provides an uplink Tunnel Endpoint ID (TEID) address to be applied as the uplink tunnel address on the NG-U interface by the S-NG-RAN node 306, which is actually a forwarding address, to re-direct uplink traffic from the S-NG-RAN node 306 to the M-NG-RAN node 308, which relays PDU Session traffic stemming from the S-NG-RAN node 306 to the UPF.
2. The S-NG-RAN node 306 provides the downlink TEID to be used on the NG-U interface. In the transition phase, i.e. until the UPF has allocated a second GTP-U entity, downlink traffic is provided by the M-NG-RAN node 308, according to the QoS flow split decided by the M-NG-RAN node 308, to the S-NG-RAN node 306.
8. Data forwarding from the M-NG-RAN node 308 to the S-NG-RAN node 306 for downlink traffic may start as early as the M-NG-RAN node 308 receives the message in step 2 from the S-NG-RAN node 308. Forwarding of uplink traffic from the S-NG-RAN node 306 to the M-NG-RAN node 308 may start as soon as uplink data arrives from the UE at the S-NG-RAN node 306.
9. At PDU Session Modification Indication, the M-NG-RAN node 308 requests the 5GC to establish a second NG-U PDU Session tunnel by indicating the split of QoS flow among the two NG-U tunnels. It also provides the downlink TEID at the S-NG-RAN node 306 for the second NG-U tunnel.
11/12. Once the UPF has allocated as second GTP-U entity executes the split, and end marker PDU is sent on the first tunnel, to indicate, that forwarding resources can be released at the MN. In some embodiments, the end marker is sent to the S-NG-RAN node 306.
13. The M-NG-RAN node 308 receives the new uplink TEID.
14. The M-NG-RAN node 308 triggers the SN Modification procedure to change the uplink TEID for the second NG-U tunnel.
15/16. The S-NG-RAN node 306 switches to the new uplink tunnel and sends an end marker to the M-NG-RAN node 308. In some embodiments, this does not need to go up to the UPF.

Figure 9:
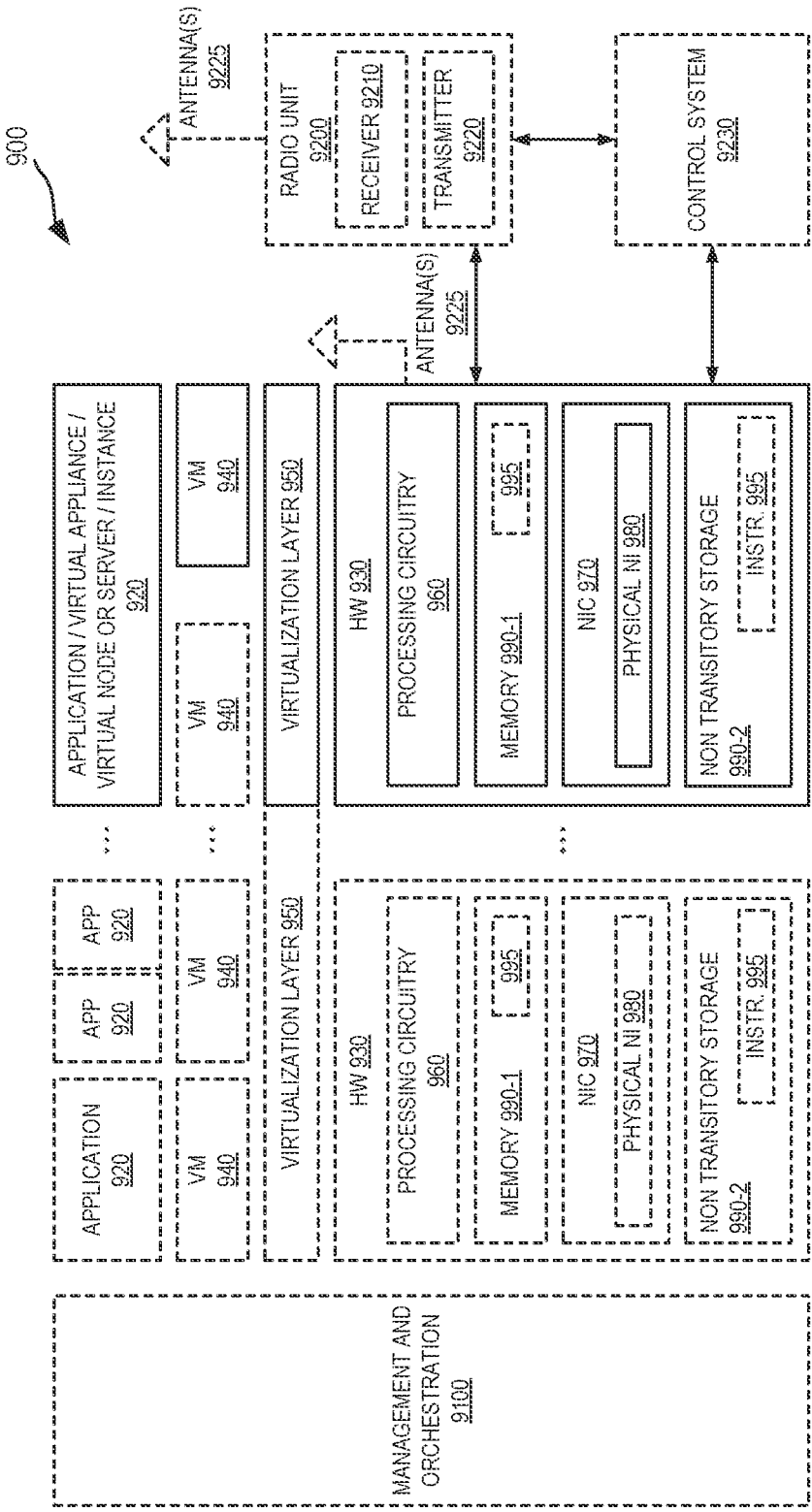
FIG. 9 is a schematic block diagram illustrating a virtualization environment in which functions implemented by some embodiments may be virtualized according to some embodiments of the present disclosure.

FIG. 9 is a schematic block diagram illustrating a virtualization environment 900 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a Wireless Device (WD), or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 900 hosted by one or more of hardware nodes 930. Further, in embodiments in which the virtual node is not a radio access node or does not require radio connectivity (e.g., a core network node), then the network node may be entirely virtualized.

The functions may be implemented by one or more applications 920 (which may alternatively be called software instances, virtual appliances, network functions, virtual nodes, virtual network functions, etc.) operative to implement some of the features, functions, and/or benefits of some of the embodiments disclosed herein. The applications 920 are run in the virtualization environment 900 which provides hardware 930 comprising processing circuitry 960 and memory 990. The memory 990 contains instructions 995 executable by the processing circuitry 960 whereby the application 920 is operative to provide one or more of the features, benefits, and/or functions disclosed herein.

The virtualization environment 900 comprises general-purpose or special-purpose network hardware devices 930 comprising a set of one or more processors or processing circuitry 960, which may be Commercial Off-the-Shelf (COTS) processors, dedicated Application Specific Integrated Circuits (ASICs), or any other type of processing circuitry including digital or analog hardware components or special purpose processors. Each hardware device 930 may comprise memory 990-1 which may be non-persistent memory for temporarily storing instructions 995 or software executed by the processing circuitry 960. Each hardware device 930 may comprise one or more Network Interface Controllers (NICs) 970, also known as network interface cards, which include a physical network interface 980. Each hardware device 930 may also include non-transitory, persistent, machine-readable storage media 990-2 having stored therein software 995 and/or instructions executable by the processing circuitry 960. The software 995 may include any type of software including software for instantiating one or more virtualization layers 950 (also referred to as hypervisors), software to execute virtual machines 940, as well as software allowing it to execute functions, features, and/or benefits described in relation with some embodiments described herein.

The virtual machines 940, comprise virtual processing, virtual memory, virtual networking or interface, and virtual storage, and may be run by a corresponding virtualization layer 950 or hypervisor. Different embodiments of the instance of virtual appliance 920 may be implemented on one or more of the virtual machines 940, and the implementations may be made in different ways.

During operation, the processing circuitry 960 executes the software 995 to instantiate the hypervisor or virtualization layer 950, which may sometimes be referred to as a Virtual Machine Monitor (VMM). The virtualization layer 950 may present a virtual operating platform that appears like networking hardware to the virtual machine 940.

As shown in FIG. 9, the hardware 930 may be a stand-alone network node with generic or specific components. The hardware 930 may comprise an antenna 9225 and may implement some functions via virtualization. Alternatively, the hardware 930 may be part of a larger cluster of hardware (e.g., such as in a data center or Customer Premises Equipment (CPE)) where many hardware nodes work together and are managed via a Management and Orchestration (MANO) 9100, which, among others, oversees lifecycle management of the applications 920.

Virtualization of the hardware is in some contexts referred to as NF Virtualization (NFV). NFV may be used to consolidate many network equipment types onto industry standard high volume server hardware, physical switches, and physical storage, which can be located in data centers and CPE.

In the context of NFV, the virtual machine 940 may be a software implementation of a physical machine that runs programs as if they were executing on a physical, non-virtualized machine. Each of the virtual machines 940, and that part of the hardware 930 that executes that virtual machine 940, be it hardware dedicated to that virtual machine 940 and/or hardware shared by that virtual machine 940 with others of the virtual machines 940, forms a separate Virtual Network Element (VNE).

Still in the context of NFV, Virtual NF (VNF) is responsible for handling specific network functions that run in one or more virtual machines 940 on top of the hardware networking infrastructure 930 and corresponds to the application 920 in FIG. 9.

In some embodiments, one or more radio units 9200 that each include one or more transmitters 9220 and one or more receivers 9210 may be coupled to the one or more antennas 9225. The radio units 9200 may communicate directly with the hardware nodes 930 via one or more appropriate network interfaces and may be used in combination with the virtual components to provide a virtual node with radio capabilities, such as a radio access node or a base station.

In some embodiments, some signaling can be effected with the use of a control system 9230, which may alternatively be used for communication between the hardware nodes 930 and the radio unit 9200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
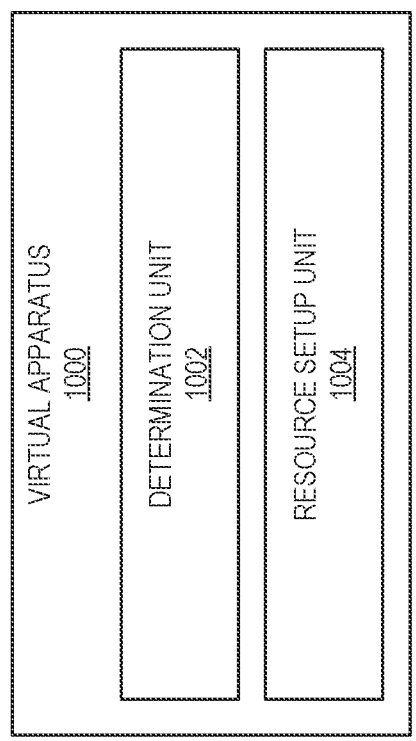
FIG. 10 illustrates a virtualization apparatus accordance with one embodiment of the present disclosure.

FIG. 10 illustrates a schematic block diagram of an apparatus 1000 in a wireless network. The apparatus may be implemented in a wireless device or network node. The apparatus 1000 is operable to carry out the example method described with reference to any processes or methods disclosed herein. At least some operations of the method can be performed by one or more other entities.

The virtual apparatus 1000 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a determination unit 1002 and a resource setup unit 1004 and any other suitable units of the apparatus 1000 to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

1. A method of operation of a network node, comprising:
   deciding to split an existing PDU session; and
   setting up resources for the split PDU session.
2. The method of embodiment 1 wherein the network node is a master NG-RAN node, and setting up resources for the split PDU session comprises:
   sending a current tunnel information for the split PDU session to a secondary NG-RAN Node;
   sending an additional tunnel information to 5GC; and
   requesting 5GC in the modification a new additional tunnel.
3. The method of embodiment 2 wherein the additional tunnel information is the one used for the existing tunnel before the split at the master NG-RAN node.
4. The method of embodiment 2 wherein the additional tunnel information is a newly allocated tunnel.
5. The method of any of embodiments 2 through 4 wherein sending the current tunnel information for the split PDU session to the secondary NG-RAN node comprises an explicit indication to indicate the PDU session is split.
6. The method of embodiment 1 wherein the network node is a master NG-RAN node, and setting up resources for the split PDU session comprises:
   initiating an S-Node addition or modification without the tunnel information;
   receiving a newly added tunnel information from a secondary NG-RAN Node;
   sending the newly added tunnel information to 5GC;
   requesting 5GC in the modification a new additional tunnel;
   receiving a new tunnel information from 5GC; and
   informing the S-Node of the new tunnel information so that the additional tunnel is setup.
7. The method of embodiment 1 wherein the network node is a master NG-RAN node, and setting up resources for the split PDU session comprises:
   keeping an additional tunnel information that is provided during the PDU session resource setup procedure.
8. The method of embodiment 1 wherein the network node is a master NG-RAN node, and setting up resources for the split PDU session comprises:
   indicating to 5GC that the current PDU session should be split into two tunnels;
   requesting an additional tunnel;
   indicating to 5GC which QoS flow will go to the existing tunnel and which QoS flow will go to the additional tunnel;
   setting up the QoS flow in a secondary NG-RAN node; and
   receiving the tunnel information.
9. The method of embodiment 1 wherein the network node is a master NG-RAN node, and setting up resources for the split PDU session comprises:
   setting up resources at a secondary NG-RAN node, but using a UL transport layer address at Xn-U;
   receiving from the secondary NG-RAN node a DL transport layer address; and
   sending the DL transport layer address together with the information on how the QoS flows are split to 5GC.
10. A network node adapted to:
    decide to split an existing PDU session; and
    set up resources for the split PDU session.
11. The network node of embodiment 10 wherein the network node is further adapted to perform the method of any one of embodiments 2 to 9.
12. A physical network node implementing a network node, the physical network node comprising:
    a network interface(s);
    a processor(s); and
    memory comprising instructions executable by the processor(s) whereby the physical network node is operable to implement the network node and the network node is operable to:
    decide to split an existing PDU session; and
    set up resources for the split PDU session.
13. The physical network node of embodiment 12 wherein the network node is further adapted to perform the method of any one of embodiments 2 to 9.

At least some of the following abbreviations may be used in this disclosure. If there is an inconsistency between abbreviations, preference should be given to how it is used above. If listed multiple times below, the first listing should be preferred over any subsequent listing(s).

- 3GPP Third Generation Partnership Project
- 5G Fifth Generation
- 5GC Fifth Generation Core
- AMF Access and Mobility Management Function
- AP Access Point
- ASIC Application Specific Integrated Circuit
- COTS Commercial Off-the-Shelf
- CPE Customer Premises Equipment
- DSP Digital Signal Processor
- eNB Enhanced or Evolved Node B
- FPGA Field Programmable Gate Array
- gNB New Radio Base Station
- GPRS General Packet Radio Service
- GTP General Packet Radio Service Tunneling Protocol
- ID Identifier
- IE Information Element
- IP Internet Protocol
- LTE Long Term Evolution
- MANO Management and Orchestration
- MCG Master Cell Group
- M-NG-RAN Master NG-RAN Node
- MN Master Node (M-NG-RAN Node)
- NAS Non-Access Stratum
- NF Network Function
- NFV Network Function Virtualization
- NG Next Generation
- NIC Network Interface Controller
- NR New Radio
- OTT Over-the-Top
- QoS Quality of Service
- PDU Protocol Data Unit
- RAM Random Access Memory
- RAN Radio Access Network
- ROM Read Only Memory
- RRH Remote Radio Head
- SMF Session Management Function
- SN Secondary Node (S-NG-RAN node)
- S-NG-RAN Secondary Next Generation Radio Access Network Node
- TEID Tunnel Endpoint Identifier
- TNL Transport Network Layer
- TS Technical Specification
- UE User Equipment
- UPF User Plane Function
- VMM Virtual Machine Monitor
- VNE Virtual Network Element
- VNF Virtual Network Function
- WD Wireless Device Those skilled in the art will recognize improvements and modifications to the embodiments of the present disclosure. All such improvements and modifications are considered within the scope of the concepts disclosed herein.

What is claimed is:

1. A method of operation of a Master Next Generation—Radio Access Network, NG-RAN, node in a cellular communications network, comprising:
deciding, by the Master NG-RAN node, to split an existing Protocol Data Unit, PDU, session that includes a current uplink tunnel information; and
setting up, by the Master NG-RAN node, resources for the split PDU session by performing one or more of:
sending, by the Master NG-RAN node, an S-Node Addition/Modification Request including the current uplink tunnel information for the split PDU session to a Secondary NG-RAN node in the cellular communications network;
receiving, by the Master NG-RAN node, a newly added additional downlink tunnel information from the Secondary NG-RAN node;
sending, by the Master NG-RAN node, a PDU Session Resource Modify Indication to a Fifth Generation Core, 5GC, node in the cellular communications network, where the PDU Session Resource Modify Indication comprises a current downlink tunnel information for the split PDU session and the newly added additional downlink tunnel information for the split PDU session;
receiving, by the Master NG-RAN node, a newly added additional uplink tunnel information from the 5GC node; and
sending, by the Master NG-RAN node, an S-Node Modification Request including the newly added additional uplink tunnel information to the Secondary NG-RAN node.

2. The method of claim 1 wherein the PDU Session Resource Modify Indication further comprises at least one of a Quality of Service, QoS flow for a tunnel identified by the current downlink tunnel information and the newly added additional downlink tunnel information for the split PDU session.

3. The method of claim 1 wherein the 5GC node is an Access and Mobility Management Function, AMF, in the cellular communications network.

4. The method of claim 1 wherein at least one of the tunnels is a General Packet Radio Services, GPRS, Tunneling Protocol, GTP-U, tunnel.

5. The method of claim 1 wherein the cellular communications network is a Fifth Generation, 5G, cellular communications network.

6. A method of operation of a network node in a cellular communications network, comprising one or more of:
receiving, by the network node, an S-Node Addition/Modification Request including a current uplink tunnel information for an existing Protocol Data Unit, PDU, session to be split from a Master Next Generation—Radio Access Network, NG-RAN, node in the cellular communications network;
sending, by the network node, a newly added additional downlink tunnel information to the Master NG-RAN node; and
receiving, by the network node, an S-Node Modification Request including a newly added additional uplink tunnel information from the Master NG-RAN node.

7. The method of claim 6 wherein the network node is a Secondary NG-RAN node.

8. The method of claim 6 wherein at least one of the tunnels is a General Packet Radio Services, GPRS, Tunneling Protocol (GTP)-U tunnel.

9. The method of claim 6 wherein the cellular communications network is a Fifth Generation, 5G, cellular communications network.

10. A method of operation of a network node in a cellular communications network, comprising:
receiving, from a Master Next Generation—Radio Access Network, NG-RAN, node, a Protocol Data Unit, PDU, Session Resource Modify Indication for an existing PDU session to be split, where the PDU Session Resource Modify Indication comprises a current downlink tunnel information for the split PDU session and a newly added additional downlink tunnel information for the split PDU session; and
sending, by the network node, a newly added additional uplink tunnel information to the Master NG-RAN node.

11. The method of claim 10 wherein the PDU Session Resource Modify Indication further comprises a Quality of Service, QoS, flow for the tunnel identified by at least one of the current downlink tunnel information and the newly added additional downlink tunnel information for the split PDU session.

12. The method of claim 10 wherein the network node is an Access and Mobility Management Function, AMF, in the cellular communications network.

13. The method of claim 10 wherein at least one of the tunnels is a General Packet Radio Services, GPRS, Tunneling Protocol, GTP-U, tunnel.

14. The method of claim 10 wherein the cellular communications network is a Fifth Generation, 5G, cellular communications network.

* * * * *